US008166005B2

(12) United States Patent
Bixby et al.

(10) Patent No.: US 8,166,005 B2
(45) Date of Patent: Apr. 24, 2012

(54) PATHNAME CACHING AND PROTECTION OF THE ROOT DIRECTORY IN A NESTED MULTILAYER DIRECTORY STRUCTURE

(75) Inventors: Peter C. Bixby, Westborough, MA (US); Xiaoye Jiang, Shrewsbury, MA (US); Uday K. Gupta, Westford, MA (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 1500 days.

(21) Appl. No.: 10/945,653

(22) Filed: Sep. 21, 2004

(65) Prior Publication Data

US 2006/0074925 A1    Apr. 6, 2006

(51) Int. Cl.
*G06F 7/00* (2006.01)
*G06F 11/00* (2006.01)

(52) U.S. Cl. ....... 707/696; 707/770; 707/966; 714/4.11; 714/6.3

(58) Field of Classification Search .................. 707/696, 707/770, 966
See application file for complete search history.

(56) References Cited

U.S. PATENT DOCUMENTS

| | | | |
|---|---|---|---|
| 4,577,272 A | 3/1986 | Ballew et al. .................. 364/200 |
| 5,175,852 A | 12/1992 | Johnson et al. ................ 395/600 |
| 5,367,671 A | 11/1994 | Feigenbaum et al. ............ 707/1 |
| 5,367,698 A | 11/1994 | Webber et al. ................. 395/800 |
| 5,495,607 A | 2/1996 | Pisello et al. ................... 707/10 |
| 5,537,588 A | 7/1996 | Engelmann et al. ........... 395/600 |
| 5,544,313 A | 8/1996 | Shachnai et al. .......... 395/200.01 |
| 5,566,328 A | 10/1996 | Eastep ........................... 707/102 |
| 5,590,320 A | 12/1996 | Maxey ............................ 395/619 |
| 5,608,903 A * | 3/1997 | Prasad et al. ..................... 707/10 |
| 5,640,501 A | 6/1997 | Turpin ............................ 715/507 |
| 5,644,736 A | 7/1997 | Healy et al. .................... 345/784 |
| 5,737,747 A | 4/1998 | Vishlitzky et al. ............. 711/118 |
| 5,740,422 A | 4/1998 | Foltz et al. ..................... 395/609 |
| 5,754,848 A | 5/1998 | Hanes ............................ 707/200 |
| 5,774,660 A | 6/1998 | Brendel et al. ........... 395/200.31 |
| 5,794,232 A | 8/1998 | Manlum et al. .................... 707/3 |
| 5,819,296 A | 10/1998 | Anderson et al. ............. 707/204 |

(Continued)

OTHER PUBLICATIONS

Legend Internet—Jargon Buster at http://www.legend.net.uk/resources/gloss.html. p. 1-12. Accessed Feb. 25, 2008.*
Uresh Vahalia, *UNIX internals: the new frontiers*, Chapter 9, "File System Implementationa," Prentice-Hall, Inc., Upper Saddle River, New Jersey, 1996, pp. 261-289.

(Continued)

*Primary Examiner* — Robert Timblin
(74) *Attorney, Agent, or Firm* — Richard Auchterlonie; Novak Druce & Quigg, LLP

(57) ABSTRACT

Servers in a storage system store a nested multilayer directory structure, and a global index that is an abstract of the directory structure. The global index identifies respective portions of the directory structure that are stored in respective ones of the servers, and the global index identifies paths through the directory structure linking the respective portions. Upon performing a top-down search of the directory structure in response to a client request and finding that a portion of it is offline, the global index is searched to discover portions of the directory structure that are located below the offline portion. The global index may also identify the respective server storing each of the respective portions of the directory structure, and may indicate whether or not each of the respective portions of the directory structure is known to be offline.

3 Claims, 10 Drawing Sheets

U.S. PATENT DOCUMENTS

| | | | | |
|---|---|---|---|---|
| 5,884,298 | A | 3/1999 | Smith et al. | 707/2 |
| 5,893,140 | A | 4/1999 | Vahalia et al. | 711/118 |
| 5,944,789 | A | 8/1999 | Tzelnic et al. | 709/214 |
| 5,974,424 | A * | 10/1999 | Schmuck et al. | 707/201 |
| 5,987,621 | A | 11/1999 | Duso et al. | 714/4 |
| 5,991,771 | A | 11/1999 | Falls et al. | 707/202 |
| 5,991,793 | A | 11/1999 | Mukaida et al. | 709/104 |
| 6,003,047 | A | 12/1999 | Osmond et al. | 707/513 |
| 6,044,444 | A | 3/2000 | Ofek | 711/162 |
| 6,052,724 | A * | 4/2000 | Willie et al. | 709/223 |
| 6,192,408 | B1 | 2/2001 | Vahalia et al. | 709/229 |
| 6,230,200 | B1 | 5/2001 | Forecast et al. | 709/226 |
| 6,269,371 | B1 * | 7/2001 | Ohnishi | 707/10 |
| 6,269,431 | B1 | 7/2001 | Dunham | 711/162 |
| 6,275,953 | B1 | 8/2001 | Vahalia et al. | 714/11 |
| 6,298,390 | B1 | 10/2001 | Matena et al. | 709/315 |
| 6,324,581 | B1 | 11/2001 | Xu et al. | 709/229 |
| 6,345,266 | B1 | 2/2002 | Ganguly et al. | 707/1 |
| 6,353,878 | B1 | 3/2002 | Dunham | 711/162 |
| 6,389,420 | B1 | 5/2002 | Vahalia et al. | 707/8 |
| 6,421,711 | B1 | 7/2002 | Blumenau et al. | 709/213 |
| 6,448,985 | B1 | 9/2002 | McNally | 345/784 |
| 6,453,354 | B1 | 9/2002 | Jiang et al. | 709/229 |
| 6,499,039 | B1 | 12/2002 | Venkatesh et al. | 707/204 |
| 6,542,967 | B1 | 4/2003 | Major | 711/134 |
| 6,571,259 | B1 | 5/2003 | Zheng et al. | 707/205 |
| 6,625,750 | B1 | 9/2003 | Duso et al. | 714/11 |
| 6,643,654 | B1 | 11/2003 | Patel et al. | 707/10 |
| 6,678,705 | B1 * | 1/2004 | Berchtold et al. | 707/204 |
| 6,714,949 | B1 | 3/2004 | Frey, Jr. | 707/200 |
| 6,721,758 | B1 | 4/2004 | Jex et al. | 707/103 |
| 6,775,679 | B2 | 8/2004 | Gupta | 707/102 |
| 6,826,582 | B1 | 11/2004 | Chatterjee et al. | 707/205 |
| 6,839,747 | B1 | 1/2005 | Blumenau et al. | 709/223 |
| 6,941,302 | B1 * | 9/2005 | Suchter | 707/5 |
| 7,043,472 | B2 * | 5/2006 | Aridor et al. | 707/3 |
| 7,111,232 | B1 * | 9/2006 | Bascom | 715/513 |
| 7,139,974 | B1 * | 11/2006 | Bascom et al. | 715/513 |
| 2002/0103779 | A1 | 8/2002 | Ricart et al. | 707/1 |
| 2002/0111956 | A1 * | 8/2002 | Yeo et al. | 707/200 |
| 2003/0088593 | A1 * | 5/2003 | Stickler | 707/205 |
| 2003/0158836 | A1 | 8/2003 | Venkatesh et al. | 707/1 |
| 2004/0015701 | A1 * | 1/2004 | Flyntz | 713/182 |
| 2004/0133606 | A1 * | 7/2004 | Miloushev et al. | 707/200 |

OTHER PUBLICATIONS

Brian W. Kernighan and Rob Pike, *The UNIX Programming Environment*, Chapter 2, The File System, Prentice-Hall, Inc., Englewood Cliffs, NJ 07632, pp. 41-70, 122-124.

File System, Free Online Dictionary of Computing, Editor Denis Howe, Imperial College Department of Computing, London, England, SW7 2AZ, wombat.doc.ic.ac.uk, Oct. 14, 2003.

Mount(8)—Linux man page, die.net, Jan. 7, 2004, 15 pages.

Glen Fowler, AST Manual, ast_mount(1), 1998-2003, AT&T Corp., akpublic.research.att.com, 2 pages.

Matloff, Norman, File Systems in Unix, Department of Computer Science, University of California at Davis, heather.cs.ucdavis.edu, Oct. 19, 1998, 5 pages.

Theodre Ts'o, Fsck(8)—Linux man page, die.net, printed Sep. 8, 2004, 3 pages.

Panagiotis Christias, Fsck(1M)—UNIX man pages, mcsr.olemiss.edu, printed Sep. 8, 2004, 5 pages.

"Sun Microsystems Gives Key Component of Network File System (NFS) to the Open Source Community," Sun Microsystems, Inc., Santa Clara, CA, Feb. 2, 2000, 2 pages.

"NFS: Network File System Protocol Specification," Network Working Group, Request for Comments: 1094, Sun Microsystems, Inc., Santa Clara, CA, Mar. 1989, 27 pages.

S. Shepler et al., "Network File System (NFS) Version 4 Protocol," Network Working Group, Request for Comments: 3530, The Internet Society, Reston, VA, Apr. 2003, 262 pages.

"Data General, Digital, Intel, Intergraph, Network Appliance and Others Join Microsoft in Support of Common Internet File System," Microsoft Corp., San Jose, Calif., Jun. 13, 1996, 2 pages.

Paul J. Leach and Dilip C. Naik, "A Common Internet File System (CIFS/1.0) Protocol," Network Working Group, Internet Engineering Task Force, The Internet Society, Reston, VA, Dec. 19, 1997, 121 pages.

Stephen M. Kaplan, Wiley Electrical and Electronics Engineering Dictionary, 2004, p. 115, IEEE Press, John Wiley & Sons, Inc., Hoboken, NJ.

Webster's Seventh New Collegiate Dictionary, 1965, p. 4, G. & C. Merriam Co., Springfield, Mass.

* cited by examiner

GLOBAL INDEX      ⟵ 40

GLOBAL INDEX ROOT-FS1-ONLINE

FS1-SER1-ONLINE
    FS2-D1/MOUNT1
    FS3-D2/MOUNT2

FS2-SER2-ONLINE

FS3-SER2-ONLINE
    FS4-D1/SD2/MOUNT1

FS4-SER3-OFFLINE

GLOBAL INDEX  ~130

GLOBAL INDEX ROOT-FS1-ONLINE

FS1-(DM1, DM2)-ONLINE
    FS2-D1/MOUNT1
    FS3-D2/MOUNT2

FS2-(DM2, DM1)-ONLINE

FS3-(DM2, DM1)-ONLINE
    FS4-D1/SD2/MOUNT1

FS4-(DM3)-OFFLINE

FIG. 12

PATHNAME CACHING AND PROTECTION OF THE ROOT DIRECTORY IN A NESTED MULTILAYER DIRECTORY STRUCTURE

FIELD OF THE INVENTION

The present invention generally relates to network data storage. The invention specifically relates to management of a nested multilayer directory structure for a network storage system.

BACKGROUND OF THE INVENTION

In a distributed storage system, network storage accessible to a network client is distributed over a plurality of network storage servers. Typically a nested multilayer directory structure keeps track of the respective network storage server that stores each directory or file in the distributed storage system. It is well known to display to a network client a portion of such a nested multilayer directory structure of directories and files accessible to the client. Various details of the directory structure can be accessible to the operating system of the network storage server but hidden from the network clients. Examples of such directory structures are found in Uday Gupta U.S. Pat. No. 6,775,679 issued Aug. 10, 2004, incorporated herein by reference, and Venkatesh et al. U.S. Patent Application Publication No. US 2003/0158836 published Aug. 21, 2003, incorporated herein by reference.

In some distributed storage systems, a single, centralized metadata server is accessed to search or update the nested multilayer directory structure. Such a centralized metadata server, however, becomes a bottleneck to file access and a single point of failure.

In the absence of a centralized metadata server, the directory search and update function are distributed among multiple servers. In this case, different portions of the directory structure are stored in different servers, and the directory structure provides links between the different portions. For example, each of the different portions of the directory structure is a respective Unix-based file system in one of the servers, and the links correspond to mount points in the nested multilayer directory structure.

SUMMARY OF THE INVENTION

It has been discovered that a distributed directory structure can create a problem when a server containing a portion of the directory structure is taken offline for a management task or is offline due to a failure. Any remaining portions of the directory structure beneath this offline portion of the directory structure may become inaccessible for searching. To solve this problem, there is kept a global index of the directory portions and the links between them. The global index is an abstract of the directory structure, and the global index retains the hierarchical relationships between the directory portions. In comparison to the directory structure, the global index is relatively static since it need change only when there is an addition or deletion of a directory portion or a change with respect to the mount points between the directory portions. Because the global index is relatively static, it can be easily protected from loss or corruption due to failure by committing any change in the global index to one or more copies in shared storage. For example, the global index can be cached in each server.

In accordance with one aspect, the invention provides a storage system including a plurality of servers for interconnection in a data network for servicing client requests for data. The servers store a nested multilayer directory structure distributed among the servers and indexing the data. The storage system is programmed to store a global index to the nested multilayer directory structure. The global index is an abstract of the nested multilayer directory structure. The global index identifies respective portions of the nested multilayer directory structure that are stored in respective ones of the servers, and the global index identifies paths through the nested multilayer directory structure linking the respective portions of the nested multilayer directory structure.

In accordance with another aspect, the invention provides a storage system including a plurality of servers for interconnection in a data network for servicing client requests for access to files. The servers store a nested multilayer directory structure distributed among the servers and indexing the files. The storage system is programmed to store a global index to the nested multilayer directory structure. The global index is an abstract of the nested multilayer directory structure. The global index identifies respective portions of the nested multilayer directory structure in respective ones of the servers, the global index identifies paths through the nested multilayer directory structure linking the respective portions of the nested multilayer directory structure, and the global index excludes directories that are not on the paths through the nested multilayer directory structure linking the respective portions of the nested multilayer directory structure. The respective portions of the nested multilayer directory structure are file systems, and the global index includes pathnames of the respective portions of the nested multilayer directory structure. The storage system is further programmed to respond to a client request to open a file specified by a pathname by performing a top-down search through the nested multilayer directory structure along a path identified by the pathname, and to access the global index to continue the search upon finding that a directory in the pathname is offline.

In accordance with yet another aspect, the invention provides a method of operating a storage system having a plurality of servers interconnected in a data network for servicing client requests for data. The servers store a nested multilayer directory structure distributed among the servers and indexing the data. The method includes maintaining, in the storage of the storage system, a global index to the nested multilayer directory structure. The global index is an abstract of the nested multilayer directory structure. The global index identifies respective portions of the nested multilayer directory structure in respective ones of the servers, and the global index identifies paths through the nested multilayer directory structure linking the respective portions of the nested multilayer directory structure. The method further includes performing a top-down search of the nested multilayer directory structure in response to a client request, and upon finding that a portion of the nested multilayer directory structure is offline, searching the global index for portions of the nested multilayer directory structure that are located below the offline portion of the nested multilayer directory structure.

In accordance with still another aspect, the invention provides a storage system including a plurality of data mover computers and at least one storage array coupled to the data mover computers for interconnection in a data network for servicing client requests for data stored in the storage array. The data mover computers are programmed for accessing a nested multilayer directory structure indexing the data in so that respective ones of the data mover computers manage access to respective portions of the nested multilayer directory structure. The storage system is programmed to store a global index to the nested multilayer directory structure. The global index is an abstract of the nested multilayer directory structure, the global index identifies the respective portions of the nested multilayer directory structure and the respective ones of the data mover computers that manage access to the respective portions of the nested multilayer directory structure, and the global index identifies paths through the nested multilayer directory structure linking the respective portions of the nested multilayer directory structure.

In a preferred implementation, a primary server that owns the root directory of the directory structure also owns the global index, and this primary server manages this global index and the root directory in such a way as to facilitate failover to a replacement server upon detection of failure of the primary server. The replacement server could be a standby server that is kept in a state of readiness to replace the primary server by assuming personality parameters of the primary server such as its IP addresses. The replacement server could be kept in the state of readiness by caching the global index, the root directory, the network configuration, and personality parameters of the root directory. Alternatively, the replacement server could be a secondary server that normally manages a lower portion of the directory hierarchy and, upon failure of the primary server, becomes primary by taking over ownership of the global index and the root directory and by loading or recovering the root directory.

BRIEF DESCRIPTION OF THE DRAWINGS

Additional features and advantages of the invention will be described below with reference to the drawings, in which:

FIG. 12 is a database implementation of a global index for the distributed network storage system in FIG. 10.

Figure 1:
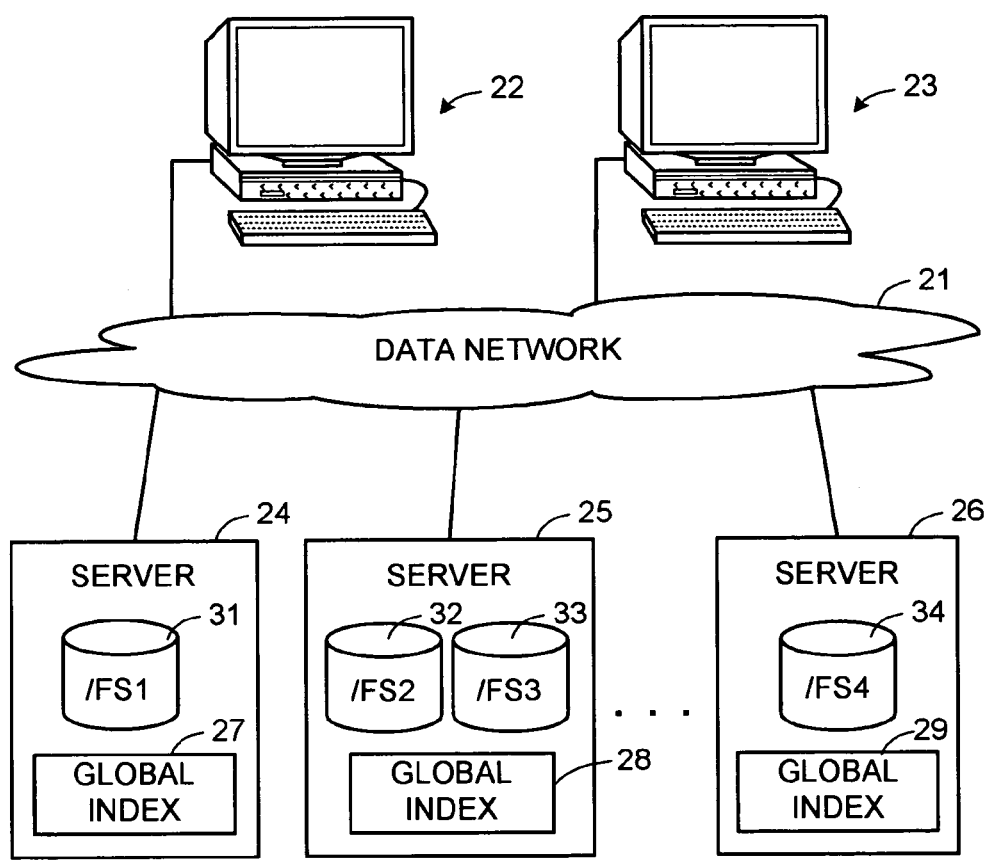
FIG. 1 is a block diagram of a distributed network storage system.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 21 interconnecting network clients 22, 23 such as personal computers to multiple servers 24, 25, and 26. Each of the servers 24, 25, 26 has storage containing a respective group of file systems. For example, the server 24 contains a first file system 31, the server 25 contains a second file system 32 and a third file system 33, and the server 26 contains a fourth file system 34.

The servers 24, 25, and 26 are programmed to appear to the network clients 22, 23 as a single file server having multiple ports to the data network 21. For example, each of the servers 24, 25, and 26 may receive and service file access requests from any of the clients for access to any user file in any of the servers. If a server receives a request for access to a user file that is in storage of another one of the servers, then the request is forwarded to the server containing the user file. In this situation, the server containing the file is said to be primary with respect to the file, and the server having initially received the request from the client is said to be secondary with respect to the file. Protocols for file access in this situation are further described in Xu et al., U.S. Pat. No. 6,324,581 issued Nov. 27, 2001, incorporated herein by reference.

Figure 2:
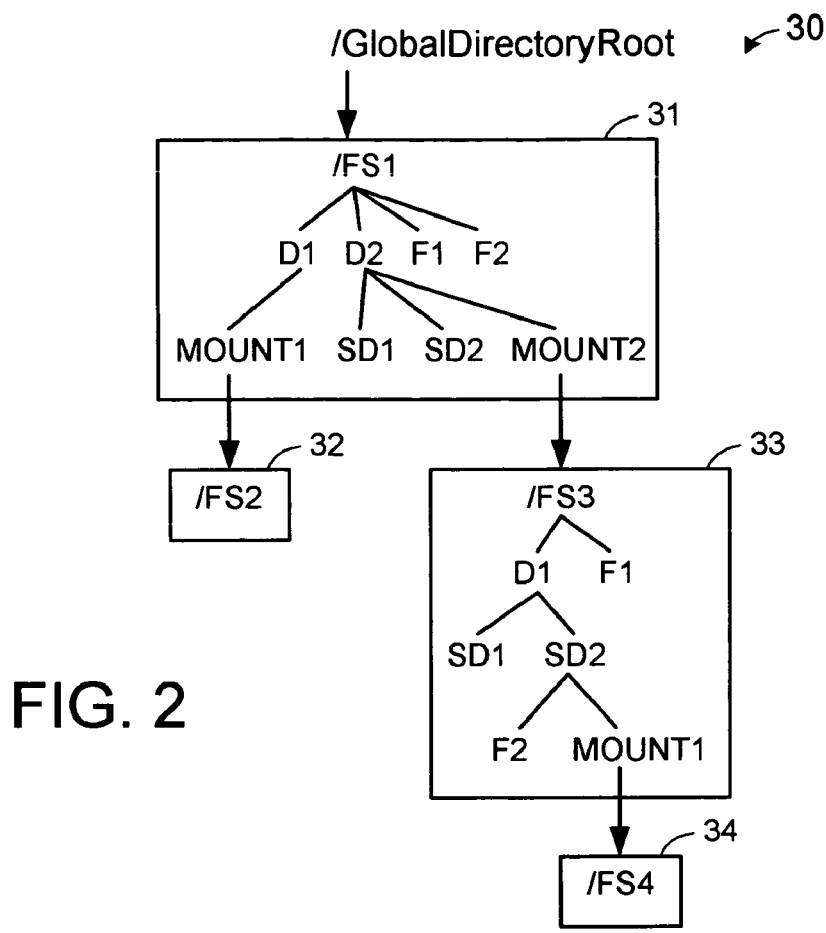
FIG. 2 is a schematic diagram of a nested multilayer directory structure for the distributed network storage system of FIG. 1.

FIG. 2 shows a nested multilayer directory structure 30 for the distributed network storage system of FIG. 1. File systems 31, 32, 33, and 34 are mounted to each other to form the directory structure 30. In this example, the first file system 31 named FS1 includes directories and files named /FS1, D1, D2, F1, F2, MOUNT1, SD1, SD2, and MOUNT2. The root directory /FS1 of the file system FS1 is also the global directory root of the directory structure 30. This root directory /FS1 contains directories D1 and D2 and files F1 and F2. The directory D1 contains a link file named MOUNT providing a mount point to the second file system 32 named FS2. The directory D2 contains subdirectories SD1 and SD2 and a link file named MOUNT2. The link file MOUNT2 provides a mount point to the third file system 33 named FS3.

The third file system 33 has a root directory named/FS3 containing a directory D1 and a file F1. The directory D1 contains subdirectories SD1 and SD2. The subdirectory SD2 contains a file F2 and a link file named MOUNT1. The link file MOUNT1 provides a mount point to the fourth file system 34 named FS4.

In various file access protocols, the nested multilayer directory structure is searched in a top-down fashion for a file specified by a path name. For example, the file named F2 in the third file system 33 has the path name, as seen by the distributed network storage system, of "/FS1/D2/MOUNT2/FS3/D1/SD2/F2". Preferably the network clients need not specify the names of the link files for the mount points so that the distributed network storage system may transparently and automatically move directories, subdirectories, and files between the servers for load balancing and storage expansion. Therefore, a network client may specify an equivalent path name of "/FS1/D2/FS3/D1/SD2/F2". A server can just as well search for a file along a specified equivalent path name by opening each link file that it finds during the search.

It has been discovered that a distributed directory structure can create a problem when a server containing a portion of the directory structure is taken offline for a management task or is offline due to a failure. Any remaining portions of the directory structure beneath this offline portion of the directory structure may become inaccessible for searching. For example, if the second file server containing the second file system 32 and the third file system 33 were to be taken off line, then the fourth file system 34 would become inaccessible during the top-down search for a file in the fourth file system. Such a top-down search for the fourth file system would become stuck when the link file MOUNT2 in the first file system 31 would be opened and an attempt to open the directory FS3 would fail.

To solve the problem of off-line portions of the distributed directory structure, there is kept a global index of the directory portions and the links between them. The global index is an abstract of the directory structure, and the global index retains the hierarchical relationships between the directory portions. In comparison to the directory structure, the global index is relatively static, since it need change only when there is an addition or deletion of a directory portion or a change with respect to the mount points between the directory portions. Since the global index is relatively static, it can be easily protected from loss or corruption due to failure by committing any change in the global index to one or more copies in shared storage. For example, as shown in FIG. 1, each of the servers 24, 25, and 26 contain a respective copy 27, 28, 29 of the global index. In order to ensure consistency of the copies of the global index, one of the servers is designated at any given time as the owner of the global index, and the other servers request this primary server to make any desired changes to the global index.

Figure 3:
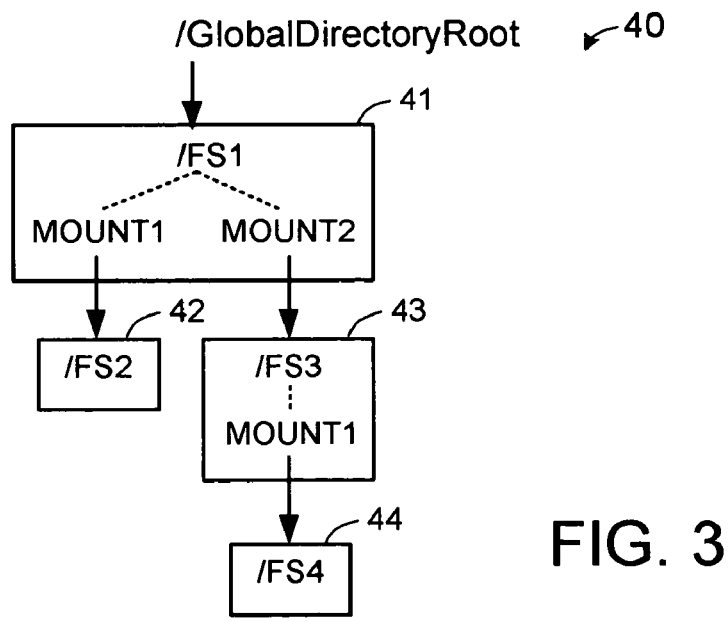
FIG. 3 is a schematic diagram of a global index for the directory structure of FIG. 2.

FIG. 3 shows a global index 40 for the directory structure 30 of FIG. 2. The global index 40 in FIG. 3 includes a respective abstract 41, 42, 43, and 44 of each of the file system directory portions 31, 32, 33, and 34 of the distributed directory structure 30. The abstract of each of the file system portions identifies the path from the file system root directory to each of the file system mount points. The directories, subdirectories, and files that are not in the path names of the link files for the mount points are omitted from the abstracts. In effect, the global index 40 provides a backup copy or double booking of the symbolic link information about the mount points in the link files.

Figures 4, 8:
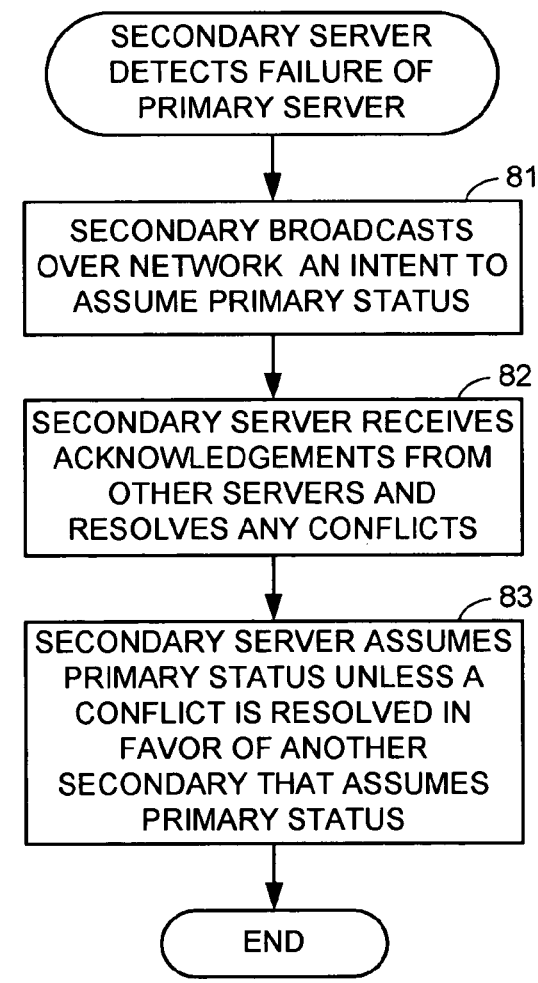
FIG. 4 is a database implementation of the global index of FIG. 3.
FIG. 8 is a flowchart of a procedure for a secondary server assuming primary status when it detects a failure of a primary server.

FIG. 4 shows a database implementation of the global index 40 of FIG. 3. In addition to the path names for each of the mount points, the global index 40 includes an identification of the server containing each of the file system directory portions. Thus, there is a set of file system directory portions and an independent set of servers, and each server contains a respective subset of the file system directory portions. The global index may include additional information about the file system directory portions and the servers, such as an indication of whether or not each directory portion is known to be offline.

A directory portion is taken offline, for example, when a file system directory portion is found to be corrupted, and when it is desired to perform a maintenance operation upon a file system directory portion. A typical maintenance operation is the auditing and repair of inconsistent conditions for file systems. Such a maintenance operation is performed by executing the "fsck" program included in the Unix and Linux operating systems. Any file system other than the root file system must be unmounted before the "fsck" program is run on it.

Figure 5:
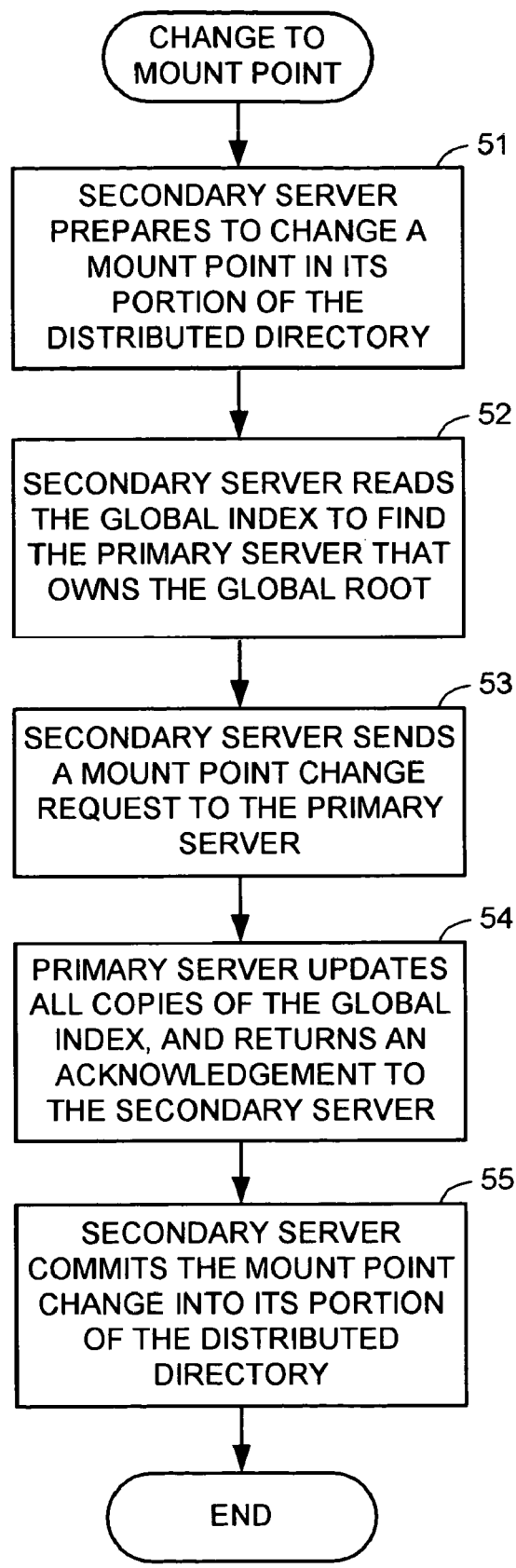
FIG. 5 is flowchart of a procedure for updating the global index when there is a change to a mount point.

FIG. 5 shows a procedure for updating the global index when there is a change to a mount point. In a first step 51, a secondary server prepares to change a mount point in its portion of the distributed directory. For example, it may be desired to change a mount point in order to shift a directory from a first file system in a first server to a second file system in a second server. In this case the first server would prepare to change the mount point by migrating the directory from the first file system to the second file system.

In step 52, the secondary server reads the global index to find the primary file server that owns the global root directory. In step 53, the secondary server sends a mount point change request to the primary server. In step 54, the primary server updates all copies of the global index, and returns an acknowledgement to the secondary server. In step 55, the secondary server commits the mount point change into its portion of the distributed directory.

Figure 6:
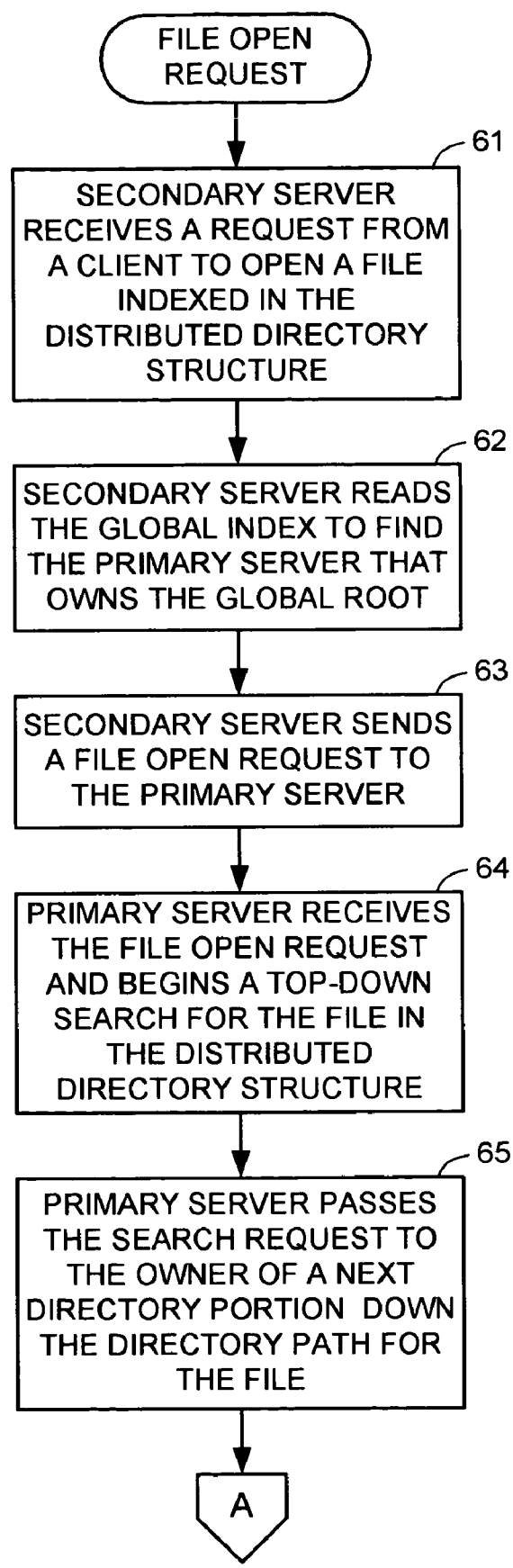
FIGS. 6 and 7 comprise a flowchart of a procedure for searching the nested multilayer directory structure in response to a file open request.
Figure 7:
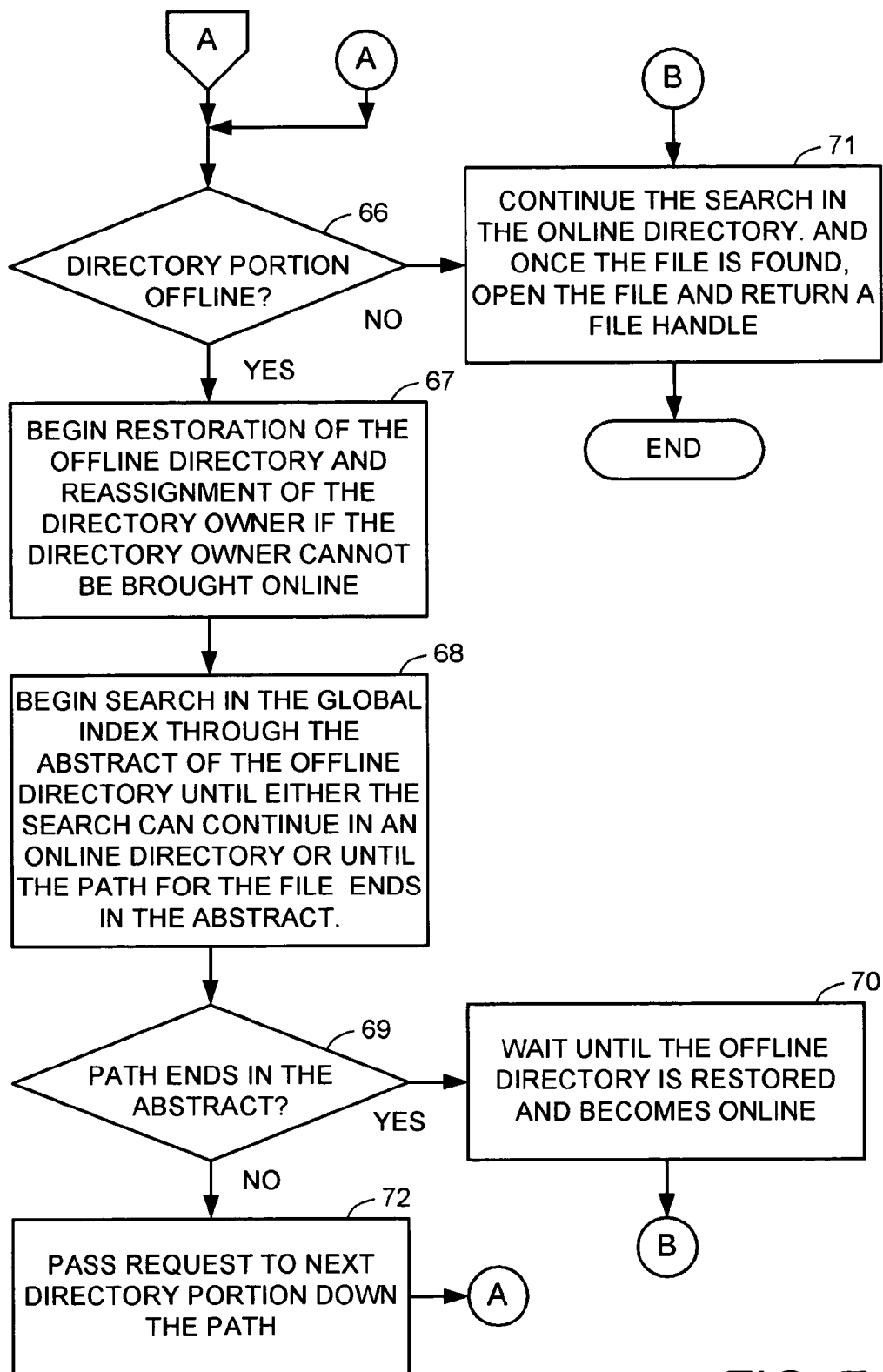

FIGS. 6 and 7 show a procedure for searching the nested multilayer directory structure in response to a file open request. In a first step 61 a secondary server receives a request from a client to open a file indexed in the distributed directory structure. In step 62, the secondary server reads the global index to find the primary server that owns the global root directory. In step 63, the secondary server sends a file open request to the primary server. In step 64, the primary server receives the file open request and begins a top-down search for the file in the distributed directory structure. In step 65, at a point during this search down the specified pathname for the file, the primary server passes the search request to the owner of a next directory portion down the directory path for the file.

For example, with reference to FIGS. 2 and 3, if the client has requested the opening of the directory /FS4 having the equivalent pathname /FS1/D2/FS3/D1/SD2/FS4, then the primary server would reach step 65 upon opening the link file MOUNT2 in the first file system 31, finding that /FS3 is the destination of the link, then finding from the global index that /FS3 is owned by the second server, and then passing the search request to the second server. Execution continues from step 65 in FIG. 6 to step 66 in FIG. 7.

In step 66 of FIG. 7, if the next directory portion is offline, then execution continues to step 67. In step 67, the server discovering that the next directory portion is offline begins restoration of the offline directory portion and reassignment of the owner of the directory portion if the owner of the directory portion cannot be brought online. For example, the server discovering that the owner of the directory portion cannot be brought online may assume primary status with respect to the offline directory, or a load balancing method may be used to select another server to assume primary status. In step 68, the server begins a search in the global index through the abstract of the offline directory portion until either the search can continue in an online directory portion or until the path for the file ends in the abstract. If the path ends in the abstract, then execution continues to step 70 to wait until the offline directory portion is restored and becomes online. Then execution continues from step 70 to step 71 to continue the search in the online directory portion. Once the file is found, the file is opened and a file handle is returned to the secondary server, which returns the file handle to the requesting client.

In step 69, if the path does not end in the abstract of the offline directory portion, then execution continues from step 69 to step 72 to pass the request to the next directory portion down the path. Execution loops from step 72 back to step 66. If this directory portion is not offline, execution branches to step 71 to continue the search in the on-line directory portion. In step 71, if an offline directory portion is reached during this continued search down the path, then the restoration of the offline directory portion is begun and the abstract of the offline directory portion is searched as described above with respect to steps 67 to 72. Once the file is found, the file is opened and a file handle is returned to the client.

FIG. 8 shows a procedure for a secondary server assuming primary status when it detects a failure of a primary server. For example, this procedure could be used in step 67 of FIG. 7 when a server passes a search request to the owner of a next directory portion down the pathname for a file to be opened, and finds that the owner cannot be brought online. In this case, the server passing the search request can become the owner of the offline directory portion and can restore the offline directory portion into its own storage from backup storage.

In a first step 81 of FIG. 8, the secondary broadcasts over the network an intention to assume primary status with respect to a specified file system. In step 82, the secondary server receives acknowledgements from the other servers and resolves any conflicts. For example, a conflict occurs if instead of receiving an acknowledgement back from another server, the other server also expresses an intention to become primary with respect to the same file system. In this situation, the conflict can be resolved by a pre-assigned priority ranking of the servers, or by applying a load balancing method, for example by giving priority to the least loaded secondary server. A lower priority server defers to a conflicting request by a higher priority server. In step 83, the secondary server assumes primary status unless a conflict is resolved in favor of another secondary that assumes primary status.

Since a search for any user file in the distributed storage system begins in the global root directory, there is an advantage to enhancing the reliability of the server that owns the global root directory, and an advantage to reducing and leveling the loading upon this primary server. Reliability can be enhanced by using a dual-redundant primary server including one server in an active mode and another in a hot stand-by mode in which data in the storage of the active server is mirrored into storage of the hot stand-by server. The loading on the primary server can be reduced and maintained at a relatively fixed level by neither storing any user files in the global root directory nor storing any other user data in the storage of the primary server. In other words, the global root directory does not allow any user file operation except for supporting the nested directory structure. In this case, the global root directory essentially becomes "read only" for user file operations and thus it is very unlikely that the global root directory will be in an inconsistent state after a system crash. Consequently, there is no need to perform a file system check upon the global root directory unless a crash occurs when the global root directory is being updated by the system administrator or the operating system.

Figure 9:
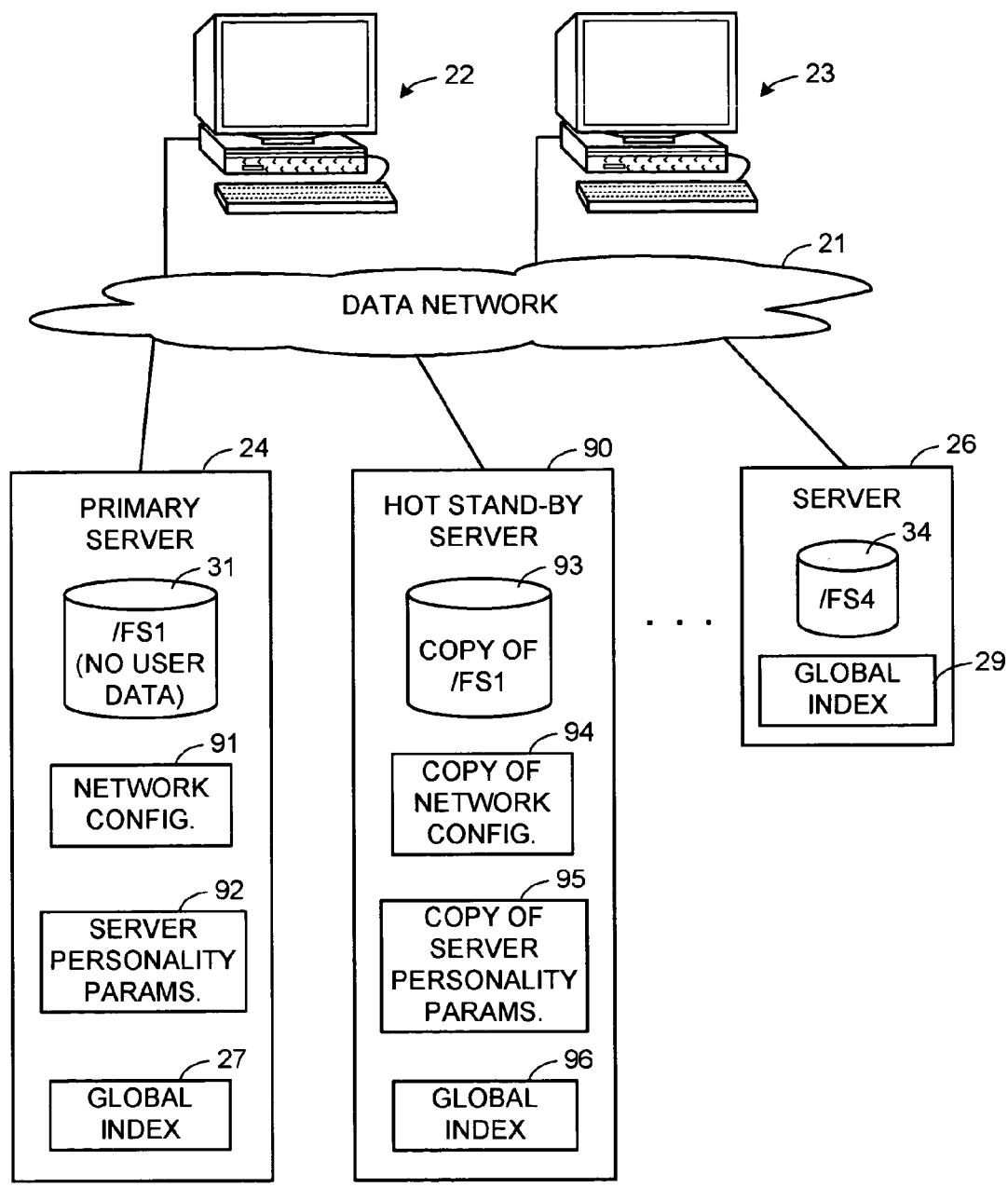
FIG. 9 is a block diagram showing the addition of a hot standby server to the distributed network storage system of FIG. 1 for failover when there is a failure of the primary server that owns the root directory of the distributed multilayer directory structure.

FIG. 9 shows the addition of a hot standby server 90 to the distributed network storage system of FIG. 1 for failover upon failure of the primary server that owns the root directory of the distributed multilayer directory structure. Data in the storage of the primary server 24 is mirrored into the hot stand-by server 90. For example, in addition to the first file system 31 containing the global root directory and the master copy 27 of the global index, the primary server 24 stores network configuration information 91 and personality parameters 92 of the primary server, such as the network IP address of the primary server. The hot stand-by server 90 stores a copy 93 of the first file system, a copy 94 of the network configuration information, a copy 95 of the personality parameters of the primary server, and a copy of 96 of the global index. Upon detecting a failure of the primary server, the hot stand-by server assumes the functions of the primary server, such as primary status with respect to the first file system, and also assumes the personality parameters of the primary server, such as the primary server's network IP address.

A secondary server can report to the hot-standby server 90 any failure of the primary server 24 to provide a timely response to a file search request. The hot stand-by server can also detect a failure of the primary server by monitoring a heartbeat signal periodically transmitted by the primary server. Techniques for failover to a hot stand-by server and continuance of interrupted tasks are further described in Vahalia et al., U.S. Pat. No. 6,275,953 issued Aug. 14, 2001, entitled Recovery from Failure of a Data Processor in a Network Server, incorporated herein by reference; Duso et al., U.S. Pat. No. 5,987,621 issued Nov. 16, 1999 entitled Hardware and Software Failover Services for a File Server, incorporated herein by reference; and Duso et al., U.S. Pat. No. 6,625,750 issued Sep. 23, 2003, entitled Hardware and Software Failover Services for a File Server, incorporated herein by reference.

In the procedures described above, each portion of the distributed nested multilayer directory structure is accessed or searched only by the server that is the exclusive owner of the directory portion. Moreover, if a directory portion is offline due to failure or due to ongoing maintenance such as a file system check, the owner of the directory portion is called upon to search the global directory, and to restore the directory portion. If a secondary server needs access to a directory portion and the owner of the directory portion is offline, then the secondary server attempts to obtain primary status with respect to the directory portion, or at least initiates a process whereby an on-line server becomes the owner of the directory portion, as described above with reference to FIG. 8.

For load balancing, it is often desirable for a secondary server to obtain ownership over a distributed directory portion owned by an on-line primary server. For example, when a new server is installed to increase the network storage capacity, a portion of the distributed directory structure is migrated to the new server in order to reduce the load on the old servers. In this case, the new server requests a transfer of ownership from the old server that owns the portion of the distributed directory structure.

Figure 10:
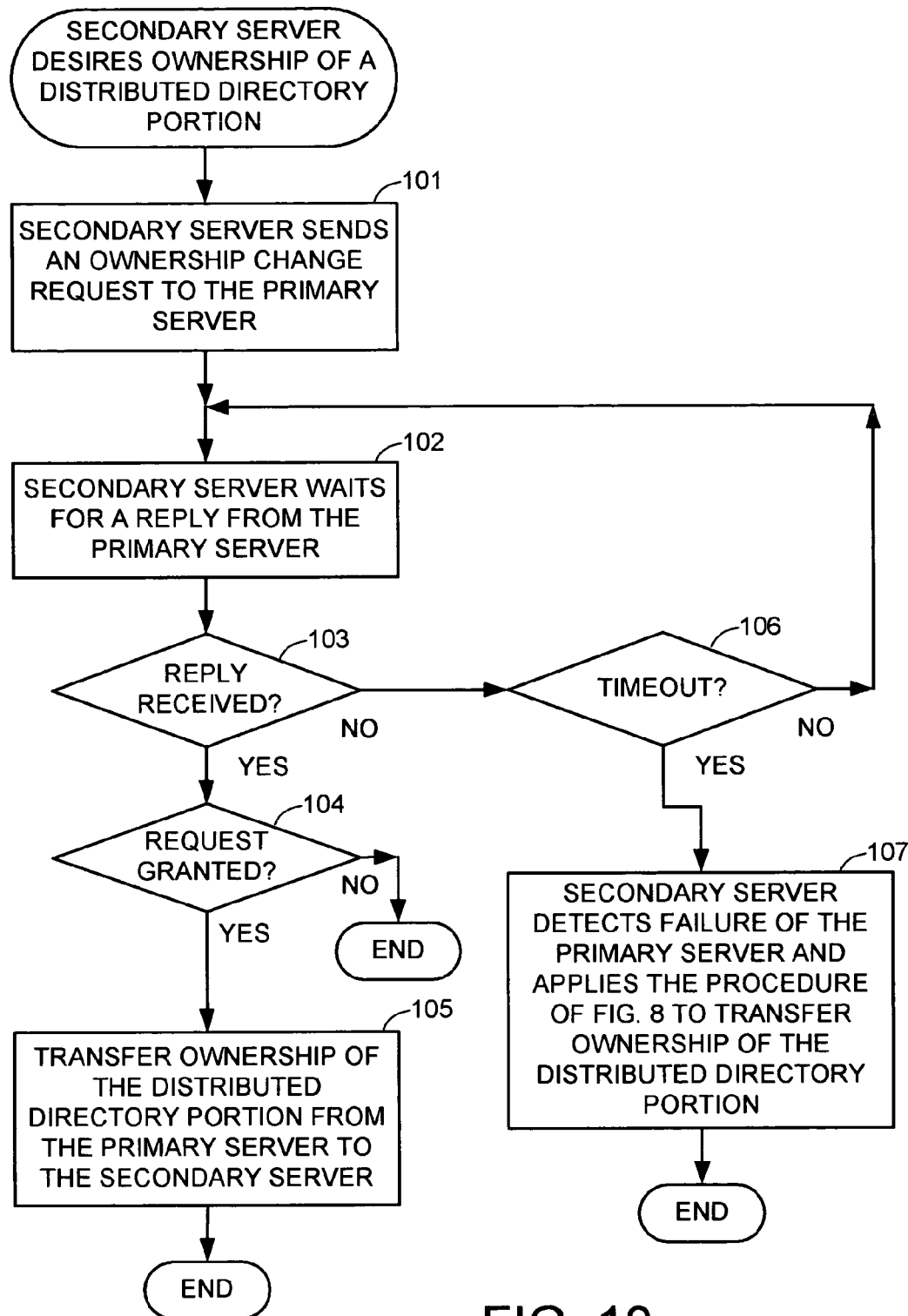
FIG. 10 is flowchart of a method for a secondary server to obtain ownership over a portion of the distributed multilayer directory structure.

FIG. 10 shows a method for a secondary server to obtain ownership of a portion of the distributed directory structure. In a first step 101, the secondary server sends an ownership change request to the primary server that owns the portion of the distributed directory structure. In step 102, the secondary server waits for a reply from the primary server. In step 103, if a reply is received from the primary server, then execution continues to step 104. In step 104, if the reply indicates that the primary server has denied the request, then the procedure is finished. Otherwise, if the reply indicates that the primary server has granted the request, then execution continues to step 105. In step 105, ownership of the distributed directory portion is transferred from the primary server to the secondary server, and the procedure is finished.

In step 103, if a reply is not received within a timeout interval checked in step 106, then execution branches to step 107. In step 107, the secondary server detects a failure of the primary server and applies the procedure of FIG. 8 to transfer ownership of the distributed directory portion. After step 107, the procedure of FIG. 10 is finished.

The description of the servers 24, 25, and 26 in the network storage system of FIG. 1 has not been limited to any particular hardware architecture. The servers 24, 25, and 26 could be commodity computers loaded with disk drives. For servers having a more complex server architecture, it may be desirable to include some server attributes in the global index.

Figure 11:
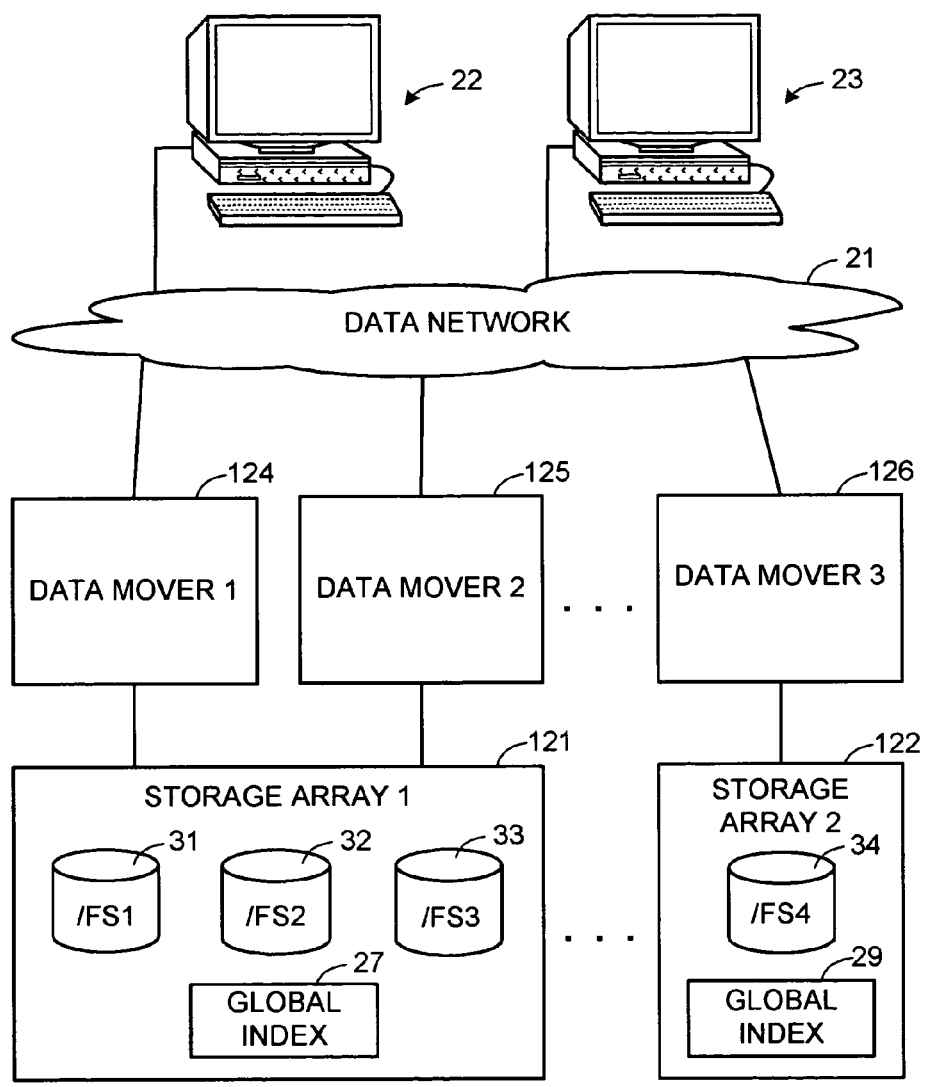
FIG. 11 is a block diagram of a distributed network storage system in which data movers function as servers and network storage is shared among groups of the data movers.

As shown in FIG. 11, for example, a network storage system includes data mover computers 124, 125, and 126 and storage arrays 121 and 122. A storage array can be a collection of storage devices interconnected via a storage area network. Alternatively, a storage array can be a cached disk storage system, such as a SYMMETRIX brand cached disk storage system sold by EMC Corporation, 176 South Street, Hopkinton, Mass. 01748. In either case, a respective separate group of the data movers couples each storage array to the data network 21. As described in Xu et al., U.S. Pat. No. 6,324,581 issued Nov. 27, 2001, incorporated herein by reference, each storage array and its respective group of data movers is programmed to function as a network file server for servicing file access requests from the network clients 22, 23. Although each data mover in the respective group for a storage array can directly access all of the file systems in the storage array, it still is desirable to eliminate contention during concurrent file system access by designating only one respective data mover in the respective group as an exclusive owner of each file system, and following the procedures described above with respect to FIGS. 4 to 9.

In the network storage system of FIG. 11, when it becomes necessary or desirable to change data mover ownership of a file system, it is desirable to give at least some priority to another data mover in the same group so long as the group includes more than one data mover, because a transfer of data mover ownership of a file system between two data movers in the same group does not require any migration of the file system between storage devices. Otherwise, each data mover in the storage system of FIG. 11 can be programmed as shown in FIGS. 4 to 10 to function in a fashion similar to a respective one of the servers in the storage system of FIG. 1. For giving priority to data movers in the same group, it is desirable to include in the global index information indicating the various groups of data movers that can directly access each file system.

FIG. 12 shows a global index 130 for the network storage system of FIG. 11. The global index 130 is similar to the global index 40 in FIG. 4 except that the global index 130 includes, for each file system, a respective list of the data movers that can directly access the file system. In addition, the data mover owner of each file system is the first data mover in each respective list. For example, "(DM1, DM2)" is the respective list of data movers for the file system named FS1, DM1 is the name of the data mover owner of FS1, "(DM2, DM1)" is the respective list of data movers for the file system named FS2, and DM2 is the name of the data mover owner of FS1.

In view of the above, there has been described a storage system including a plurality of servers for interconnection in a data network for servicing client requests for data. The servers store a nested multilayer directory structure distributed among the servers and indexing the data, and a global index that is an abstract of the nested multilayer directory structure. Each server keeps a copy of the global index in its local memory, performs directory searches for files to be accessed in the file systems that it owns, and services client requests for access to file systems that it does not own by passing these requests to the file system owners. The global index identifies respective portions of the nested multilayer directory structure that are stored in respective ones of the servers, and the global index identifies paths through the nested multilayer directory structure linking the respective portions of the nested multilayer directory structure. Upon performing a top-down search of the nested multilayer directory structure in response to a client request and finding that a portion of the nested multilayer directory structure is offline, the global index is searched to discover portions of the nested multilayer directory structure that are located below the offline portion of the nested multilayer directory structure. The global index may also identify the respective server storing each of the respective portions of the nested multilayer directory structure, and may indicate whether or not each of the respective portions of the nested multilayer directory structure is known to be offline. Preferably a primary copy of the global index is kept in a root directory of the nested multilayer directory structure, and this root directory does not include any user files or user data.

What is claimed is:

1. A storage system comprising:
a plurality of servers for interconnection in a data network for servicing client requests for data, the servers storing a nested multilayer directory structure distributed among the servers and indexing the data,
wherein the storage system is programmed to store a global index to the nested multilayer directory structure, the global index is an abstract of the nested multilayer directory structure, the global index identifies respective portions of the nested multilayer directory structure that are stored in respective ones of the servers, and the global index identifies paths through the nested multilayer directory structure linking the respective portions of the nested multilayer directory structure, and
wherein the storage system is further programmed to perform a top-down search of the nested multilayer directory structure in response to a client request, and upon finding that a portion of the nested multilayer directory structure is offline so as to be inaccessible for searching, to search the global index for portions of the nested multilayer directory structure that are located below the offline portion of the nested multilayer directory structure;
wherein each of at least some of the servers is programmed to take over responsibility for maintenance of a respective portion of the nested multilayer directory structure by broadcasting an intention to take over responsibility for maintenance of the respective portion of the nested multilayer directory structure, receiving replies from the other of said at least some of the servers, resolving conflict in the replies, and taking over responsibility for maintenance of the respective portion of the nested multilayer directory structure upon resolving the conflict in favor of said each of at least some of the servers.

2. A method of operating a storage system having a plurality of servers interconnected in a data network for servicing client requests for data, the servers storing a nested multilayer directory structure distributed among the servers and indexing the data, said method comprising:
maintaining, in storage of the storage system, a global index to the nested multilayer directory structure, the global index being an abstract of the nested multilayer directory structure, the global index identifying respective portions of the nested multilayer directory structure in respective ones of the servers, and the global index identifying paths through the nested multilayer directory structure linking the respective portions of the nested multilayer directory structure; and
performing a top-down search of the nested multilayer directory structure in search of a file in response to a client request, and upon finding that a portion of the nested multilayer directory structure is offline so as to be inaccessible for searching, searching the global index for portions of the nested multilayer directory structure that are located below the offline portion of the nested multilayer directory structure, and searching at least one of said portions of the nested multilayer directory structure below the offline portion of the nested multilayer directory structure to find the file and to return to the client a file handle to the file;

which includes one of the servers taking over responsibility for maintenance of a respective portion of the nested multilayer directory structure by broadcasting an intention to take over responsibility for maintenance of the respective portion of the nested multilayer directory structure, receiving replies from the other of said at least some of the servers, resolving conflict in the replies, and taking over responsibility for maintenance of the respective portion of the nested multilayer directory structure upon resolving the conflict in favor of said one of the servers.

3. A storage system comprising:

a plurality of data mover computers and at least one storage array coupled to the data mover computers for interconnection in a data network for servicing client requests for data stored in the storage array, the data mover computers being programmed for accessing a nested multilayer directory structure so that respective ones of the data mover computers manage access to respective portions of the nested multilayer directory structure, wherein the storage system is programmed to store a global index to the nested multilayer directory structure, the global index is an abstract of the nested multilayer directory structure, the global index identifies the respective portions of the nested multilayer directory structure and the respective ones of the data mover computers that manage access to the respective portions of the nested multilayer directory structure, and the global index identifies paths through the nested multilayer directory structure linking the respective portions of the nested multilayer directory structure, wherein the storage system is further programmed to perform a top-down search of the nested multilayer structure in response to a client request, and upon finding that a portion of the nested multilayer directory structure is offline so as to be inaccessible for searching, to search the global index for portions of the nested multilayer directory structure that are located below the offline portion of the nested multilayer directory structure, and wherein each of at least some of the data mover computers is programmed to take over responsibility for managing access to a respective portion of the nested multilayer directory structure by broadcasting an intention to take over responsibility for managing access to the respective portion of the nested multilayer directory structure, receiving replies from the other of said at least some of the data movers, resolving conflict in the replies, and taking over responsibility for managing access to the respective portion of the nested multilayer directory structure upon resolving the conflict in favor of said each of at least some of the data movers.

* * * * *